United States Patent
Keller et al.

(10) Patent No.: US 6,690,888 B1
(45) Date of Patent: Feb. 10, 2004

(54) METHOD FOR ESTABLISHING AND MAINTAINING OPTICAL, OPEN-AIR COMMUNICATIONS LINK

(75) Inventors: Robert Keller, Plano, TX (US); Jose Melendez, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 562 days.

(21) Appl. No.: 09/621,385

(22) Filed: Jul. 21, 2000

(51) Int. Cl.[7] .............................................. H04B 10/10
(52) U.S. Cl. ...................................... 398/129; 398/201
(58) Field of Search .................................. 359/155, 159, 359/172, 173; 398/122, 123, 129, 131, 201

(56) References Cited

U.S. PATENT DOCUMENTS

| | | | | |
|---|---|---|---|---|
| 4,512,036 A | * | 4/1985 | Laor | 359/159 |
| 4,995,101 A | * | 2/1991 | Titterton et al. | 359/112 |
| 5,062,150 A | * | 10/1991 | Swanson et al. | 359/152 |
| 5,218,467 A | * | 6/1993 | Ross et al. | 359/172 |
| 5,475,520 A | * | 12/1995 | Wissinger | 359/172 |
| 5,592,320 A | * | 1/1997 | Wissinger | 359/159 |
| 6,044,705 A | | 4/2000 | Neukermans et al. | 73/504.02 |
| 6,198,528 B1 | * | 3/2001 | Maynard | 356/141.1 |
| 6,469,815 B1 | * | 10/2002 | Poon et al. | 359/159 |
| 6,504,634 B1 | * | 1/2003 | Chan et al. | 359/159 |
| 6,535,314 B1 | * | 3/2003 | Mendenhall et al. | 359/172 |
| 2002/0081060 A1 | * | 6/2002 | Margalit et al. | 385/18 |

* cited by examiner

Primary Examiner—Leslie Pascal
(74) Attorney, Agent, or Firm—William B. Kempler; W. James Brady, III; Frederick J. Telecky, Jr.

(57) ABSTRACT

A method for controlling an optical, path-to-sight link, the optical link including a source of light having a beam of light, a controllable beam steering device and an actuator to permit steering the light beam, the beam steering device being controllable by predetermined control signals. The method includes the following steps. The beam steering device is controlled so as to scan the beam of light in a first predetermined pattern. First direction is received data from a remote receiver including a light detector, the direction data corresponding to a direction of the beam at which the scanned beam of light is detected by the light detector. Responsive to the first direction data, a first beam direction is determined for data communication from the link to the receiver. The beam steering device is controlled to maintain a communications beam direction corresponding to the first beam direction. The beam of light is modulated with electronic signals.

2 Claims, 11 Drawing Sheets

US 6,690,888 B1

METHOD FOR ESTABLISHING AND MAINTAINING OPTICAL, OPEN-AIR COMMUNICATIONS LINK

TECHNICAL FIELD OF THE INVENTION

This invention relates to methods for data communications, and more particularly relates to a method for establishing and maintaining an optical, open-air communications link.

BACKGROUND OF THE INVENTION

An emerging technology is that of a low cost, high bandwidth, wireless optical data communications system. Such systems utilize a transmitter and receiver, with each transmitter and optionally the receiver having a rotatable micro-mirror and light source, such as a laser, and are used to communicate data on a path-to-sight basis. Many optical wireless systems do not have any feedback method, which requires manual alignment using telescopes precisely aligned to the axis of the outgoing laser beam. To account for system vibrations and mis-alignment, the beam is often slightly mis-collimated, which eases the alignment tolerance. An example of this is in the Terralink 1000X (Astroterra), which has an output divergence of 2.5 mrad, which allows a mis-alignment of 1 mrad.

There is a need for an efficient and effective method for establishing and maintaining the actual link when using such systems.

SUMMARY OF THE INVENTION

In accordance with the present invention a method is provided for controlling an optical, path-to-sight link, the optical link including a source of light having a beam of light, a controllable beam steering device to permit steering the light beam, the beam steering device being controllable by predetermined control signals. The method includes the following steps. The beam steering device is controlled so as to scan the beam of light in a first predetermined pattern. First detection data is received from a remote receiver including a light detector, the detection data corresponding to the detected intensity and/or time when the scanned beam of light is detected by the light detector. Responsive to the first detection data, a first beam direction is determined for data communication from the link to the receiver. The beam steering device is controlled to maintain a communications beam direction corresponding to the first beam direction. The beam of light is modulated with electronic signals.

As used herein, the term path-to-sight is intended to mean an unobstructed optical path generally through the ether, as contrasted with through an optic fiber, which path can include reflections.

These and other features of the invention will be apparent to those skilled in the art from the following detailed description of the invention, taken together with the accompanying drawings.

DETAILED DESCRIPTION OF THE PREFERRED EMBODIMENT

The method of the preferred embodiment of the present invention is used to establish and maintain a communications link between a pair of optical wireless link devices. The following includes a description of a link device with which the preferred embodiment may be employed. The method is not limited to use with such a link device, however, and may be used in conjunction with any wireless link apparatus using a light source, such as a laser or light emitting diode (LED), and a controllable beam steering device, such as, for example, a rotatable micro-mirror, or any other device that changes the direction of the light beam without changing the orientation of the light emitter. The link device may also include a secondary communications link, which may be used in closed loop to control the beam steering device.

Figure 1:
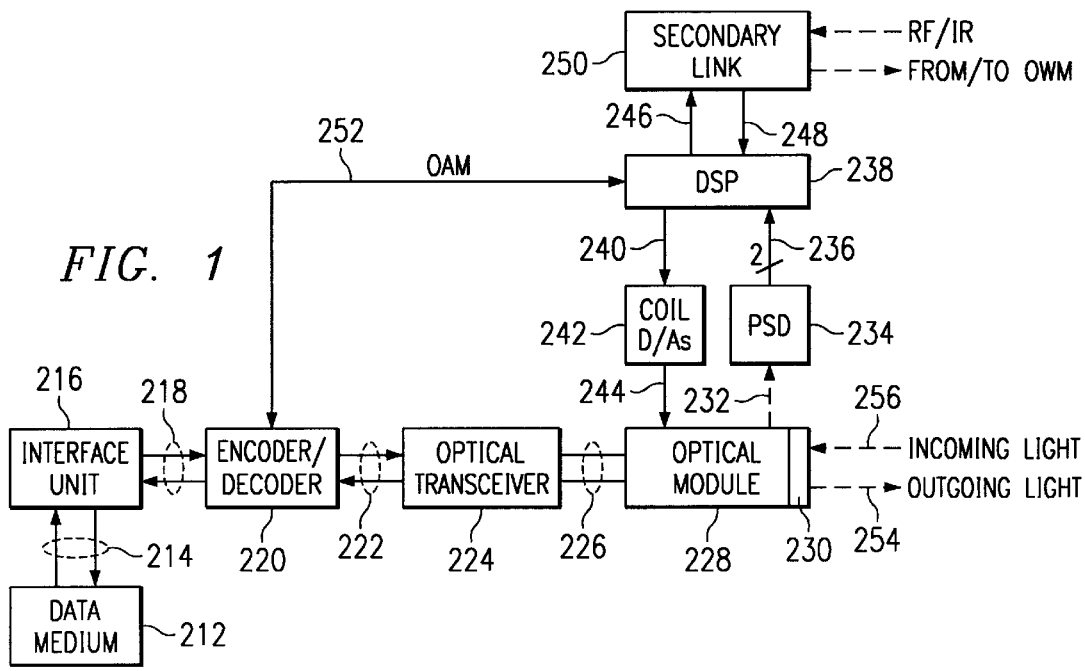
FIG. 1 is a block diagram of an optical wireless link according to a preferred embodiment of the present invention.

FIG. 1 is a block diagram of an Optical Wireless Link ("OWL") 210 used in the preferred embodiment of the present invention. A Data Medium 212, such as a data channel, network, device, or the like providing a source/sink of data is coupled by a two-way Data Link 214 to an Interface Unit 216. The data transmitted to/from the Data Medium 212 may be either analog or digital data. Digital data may be in either parallel or serial format. Thus, the data can be analog or digital voice data, analog or digital video data, or any other form of data represented in electronic signal format.

The Interface Unit 216 performs conventional and necessary conversion and conditioning of the data to/from Data Medium 212. This can take the form of dedicated hardware for conversion/conditioning of a specific data type, or it can be software configurable hardware that could handle multiple formats without interruption or delay as formats change. Or, it can take any of a number of intermediate forms. In all such embodiments, the purpose of Interface Unit 216 is as follows. If providing the function of receiving digital data, the purpose of Interface Unit 216 is to take such received digital-data from an Encoder/Decoder 220, described below, and convert such data to an format, analog or digital, suitable for transmission on Data Medium 212, and to provide whatever conditioning of such signals is appropriate for the Data Medium 212, converting such data to parallel format, if the Data Medium 212 requires parallel digital format. If providing the function of receiving analog data, the purpose of Interface Unit 216 is to take such received analog data signals, to provide whatever conditioning of such analog signals is appropriate for the Data Medium 212, and provide them to the Data Medium 212. The purpose of Interface Unit 216 in the transmission of data is, if providing the function of transmission of analog data, to take analog signals and provide them appropriately to Encoder/Decoder 220, or, if providing the function of transmission of digital data, to take serial or parallel digital data and provide such data appropriately to Encoder/Decoder 220, converting such data to serial format if provided by Data Medium 212 in parallel format. The interface art is mature and well known, and the construction and operation of any such interface unit appropriate for the particular context to which the OWL 210 is applied is well within the purview of those skilled in this art.

The Interface Unit 216 is coupled by a two-way Data Link 218 to an Encoder/Decoder unit 220. The Encoder/Decoder unit 220 is likewise of conventional construction and operation. It encodes serial data from Interface Unit 216 as needed for transmission and decodes received data for provision to Interface Unit 216. Encoding may also include parceling the data in packets, adding Operation/Administration/Maintenance ("OAM") data from a link control DSP/Microcontroller 238, described below, and/or adding error correction/detection information. Decoding may also include extracting the data from received packets, extracting OAM information for the link control DSP/Microcontroller 238, and/or performing error correction/detection. The encoding/decoding art is mature and well known, and the construction and operation of any such encoding/decoding unit appropriate for the particular context to which the OWL 210 is applied is well within the purview of those skilled in this art. For example, encoder/decoders for the Ethernet protocol, asynchronous transfer mode ("ATM") protocol, SONET protocol, Token Ring protocol, etc., are all well known in the art, and may be used for Encoder/Decoder unit 220, as the case may be.

An in-depth discussion of the general principles of implementation and operation for both the Interface Unit 216 and the Encoder/Decoder Unit 220 may be found in *Digital Modulation and Coding,* Stephen G. Wilson, Prentice Hall, Upper Saddle River, N.J., 1996. Specific principles of implementation and operation for such units in connection with the Ethernet protocol can be found in *Gigabit Ethernet Handbook,* Stephen Saunders, McGraw Hill, New York, N.Y., 1998. In addition, numerous off-the-shelf components are available for implementing these units. For example, again in the Ethernet context, Texas Instruments Inc. offers the "10/100 Ethernet PHY" component, that may be used as the Interface Unit 216. In addition, Texas Instruments Inc. offers the "TNETE2201B, 1.25-Gigabit Ethernet Transceiver" component, that may be used as the Encoder/Decoder Unit 220.

The Encoder/Decoder Unit 220 is coupled by a two-way Data Link 222 to an Optical Transceiver Unit ("OTU") 224. The OTU 224 acts as an electrical to light and light to electrical converter. It contains a light source such as a laser diode, control electronics for the light source, a photodetector for converting the received light to electrical signals and amplifiers to boost the electrical signal strength to that compatible with the decoder.

The OTU 224 can also be of conventional design. For example, a TTC-2C13 available from TrueLight Corporation of Taiwan provides an advantageous and low cost optical transceiver unit, requiring only a single +5V power supply, consuming low power, and providing high bandwidth. However, it should be noted that OTU units of conventional design can provide less than optimal performance, since such units are typically designed for transmit and receive light from fibers. This results in three problems that should be noted by the designer. First, light is contained in such units and is thus not subject to the same eye safety considerations as open air optical systems such as the present invention. Consequently, such units may have excessively high power. Second, light is transmitted to a fiber and thus has optical requirements that are different from those where collimation is required, as in embodiments of the present invention. Third, light is received by such units from a narrow fiber, and therefore such units usually have smaller detector areas than desired for embodiments of the present invention. Accordingly, it is considered preferable to assemble a transceiver having a photoediode and optical design such that the maximum amount of light is collected from a given field of view. This requires as large a photodiode as possible, with the upper limit being influenced by factors such as photodiode speed and cost.

The Optical Transceiver Unit 224 is coupled by a two-way data link 226 to an Optical Module 228. The Optical Module 228 contains optical components for collimating the outgoing light 254 from the transceiver, a micro-mirror controlled by, e.g., electromagnetic coils shown and described below, for directing the collimated light in the direction of a second OWL (not shown), with which OWL 210 is in communication, and receiving optics to concentrate the light received from the second OWL on a transceiver photodetector included in the Optical Module 228. The receiving optics can include a control mirror, either flat or curved, to direct the light to the photodetector. Auxiliary photodetectors can be provided adjacent to the main photodetector for light detection in connection with a control subsystem (not shown), for controlling the control mirror, and maximize the light capture at the photodetector. The Optical Module 228 may also contain a spectral filter 230 to filter ambient light from the incoming signal light 256. The Optical Module 228 is described in detail below. It should be understood, however, that the Optical Module 228 described herein is merely a preferred embodiment thereof, and that other variations are possible. For example, a micro-mirror need not be used, but rather any controllable beam steering device can be used that changes the direction of the light beam without changing the orientation of the light emitter. In addition, a basic function of the Optical Module 228 is that it sufficiently collimate the light into a beam that will (1) substantially fit within the micro-mirror reflecting area, and (2) preserve the minimum detectable optical power density over the distance of the link. Laser diodes generally meet these criteria, and as such are preferred. However, light emitting diodes ("LEDs") and other light sources can be made to satisfy these criteria, as well.

For optical wireless links across large distances where the highest possible optical power density at the receiver is needed for robust transmission, the optical transmitter portion of this embodiment should preferably be selected to achieve a divergence of less than 0.5 mrad, which is to be contrasted with the prior art systems mentioned above that have divergences in the range of 2.5 mrad. The divergence of less than 0.5 mrad results in an optical density greater than 25 times the optical density of the prior art systems, which, for the same received optical power density corresponds to 5 or more times longer range.

The optical receiver portion of this embodiment should be selected to have an intermediate size, preferably having a diameter in the range of 0.5 millimeter (mm) to 1 centimeter (cm). If the diameter is much smaller than 0.5 mm, it may be difficult to collect all of the light directed on the receiver. On the other hand, if the diameter is much larger than 1 cm, the responsiveness of the detector may diminish to the point where the performance of the system is compromised.

It should also be understood that more than one Optical Transceiver unit 224 may be provided in some embodiments, for example to provide multiple wavelengths to transmit information across a single link, in order to increase the bandwidth of a given OWL link. This involves generating light beams having multiple wavelengths and collecting and separating these separate light beams. Numerous apparatus and methods are known in the art to accomplish this.

The Optical Module 228 is coupled by an optical path 232 to a Position Sensitive Detector ("PSD") 234. The PSD 234 measures the angular deflection of the micro-mirror in two planes by detecting the position of a spot of light on a sensor in the PSD 234. The analog signals representing these angular deflections are converted into signals and sent on lines 236 to a Digital Signal Processor ("DSP") 238 for closed loop. control of the micro-mirror in Optical Module 228. PSDs are well known in the art, and PSD 234 may be any of a variety of types, including a single diode Si PSD, CMOS photo-detector array, and the like. All that is required of PSD 234 is that it sense, in two directions, the position of a spot of light impinging thereon, and provide as outputs digital signals representative of such position. However, note that the use of analog control signals is not required in the practice of the present invention. Other known control signal approaches can be used. For example, pulse width modulation may be used to provide such control. Such choices of control system are well within the purview of those of ordinary skill in this art.

In addition to receiving the signal lines 236 from the PSD 234, the DSP 238 sends coil control signals on lines 240 to a set of coil digital to analog converters ("D/As") 242. The D/As 242 are, in turn, connected by way of lines 244 to a corresponding set of coils, shown and described in detail below, in Optical Module 228. The DSP 238 is also connected to send data on a line 246 to, and receive data on a line 248 from a secondary Link 250. Finally, the DSP 238 is connected via line 252 to send and receive OAM data to/from Encoder/Decoder 220.

The DSP 238 operates as a link control. It controls the micro-mirror deflections by controlling the coil currents through the D/As 242. Information on the instantaneous micro-mirror deflections is received from the PSD 234 for optional closed loop control. The DSP 238 also exchanges information across the Secondary Link 250 to the second OWL to orient the beam steering micro-mirror in the proper direction for the link to be established and maintained. The DSP 238 may also exchange OAM information with the second OWL across the optical link maintained by Optical Module 228.

DSP 238 may be any suitable DSP, of which many are commercially available. Optionally, a microcontroller may be used in the place of DSP 238. In addition, note that a single processor may control multiple OWL links. This capability can be very valuable for use in a network hub, where multiple links originate or terminate in a single physical network switch. A single DSP could provide a very cost efficient control facility in such cases. In all such cases, the requirements for this processor are a sufficiently high instruction processing rate in order to control the specified number of micro-mirrors, and a sufficient number of input/output ("I/O") ports to manage control subsystem devices and peripheral functions. A suitable DSP for many such embodiments is a Texas Instruments Incorporated DSP from its C5x family of DSP microprocessors.

The Secondary Link 250 is used to transfer low bandwidth information between the OWLs. This information can be used to aid establishment of the optical link by transferring the strength of the received signal. The Secondary Link 250 is a low bandwidth link, and may be, for example, an RF link such as the Bluetooth link, or IR link such as the type used in remote controllers for electronic devices such as televisions, VCRs, hi-fi systems, and the like. The Secondary Link 250 could also be an existing physical link, such as a telephone line, power line, or other existing lower bandwidth network. Construction and operation of such links are well known in this art.

Figure 2A:
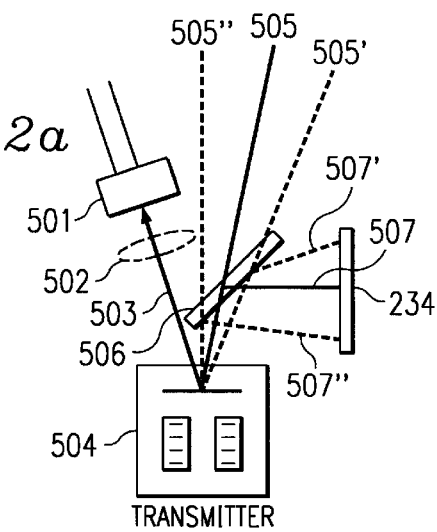
FIG. 2(A) is a schematic view of an optical transmitter of an Optical Module of a preferred embodiment.
Figure 2B:
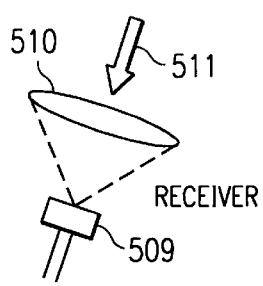
FIG. 2(B) is a schematic view of an optical receiver of an Optical Module of a preferred embodiment.

The Optical Module 228 will now be described. This unit is very compact, high speed in operation, low cost and reliable in operation. The optical module contains a transmitter section, shown in FIG. 2(A), and a receiver section, shown in FIG. 2(B). In the transmitter section, light emitted by the light source 501 in the optical transceiver unit is focused or collimated by lens 502 in an optical beam 503. The optical beam 503 is reflected by a mirror in a rotatable mirror assembly 504, the mirror being shown in its middle or neutral unpowered position, in direction 505. The rotatable mirror is moveable between two opposite extremes, with optical beam 303 correspondingly reflected to 505', 505" at the extremes. Although the movement of the mirror shown in FIG. 2(A) illustrates movement in one plane, mirror movement in a second plane is also included in the operation of the optical wireless link and will be described below. The reflected optical beam passes through a beam splitter 507 that reflects a portion of the beams 505, 505' and 505" in directions 507, 507' and 507", respectively, to the PSD 234 and transmits the rest of the beam out of the optical wireless link.

The receiver section of the optical module contains optics 510 for concentrating in incoming light 511 onto the photodiode 509 in the optical transceiver unit to increase the received optical signal. The optics can be imaging optics with the photodiode at the focal plane or non-imaging optics such as a Winston cone.

The rotatable mirror assembly 304 will now be described in detail.

Figure 3:
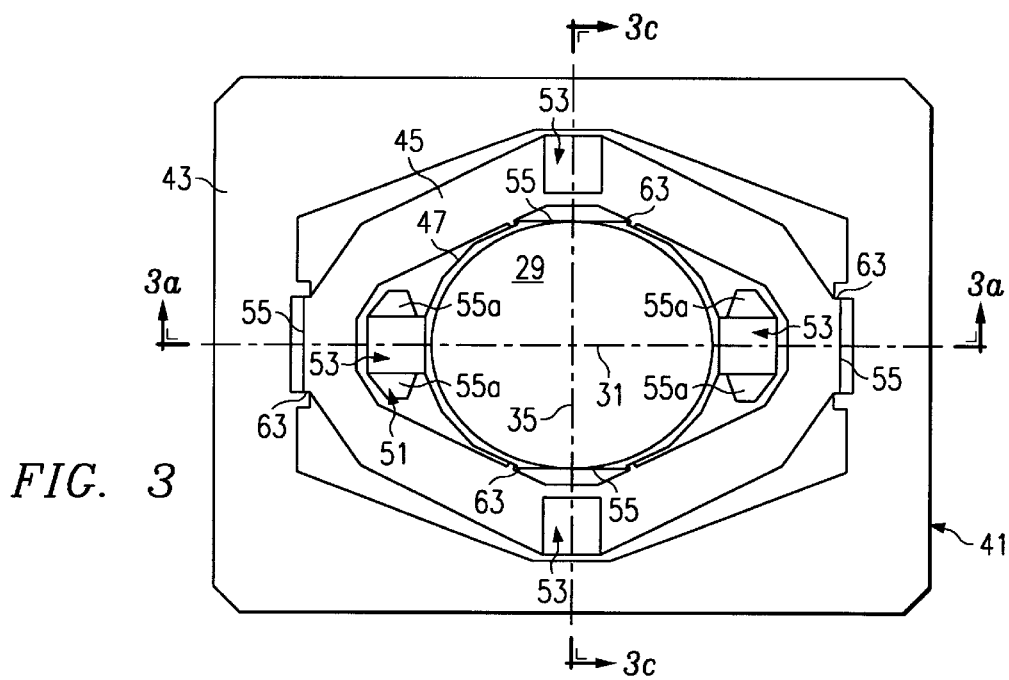
FIG. 3 is a plan view of a mirror assembly used in the FIG. 2 switch unit.

Mirror assembly 41, FIG. 3, includes a frame portion, an intermediate gimbals portion and an inner mirror portion preferably formed from one piece of crystal material such as silicon. The silicon is etched to provide outer frame portion 43 forming an opening in which intermediate annular gimbals portion 45 is attached at opposing hinge locations 55 along first axis 31. Inner, centrally disposed mirror portion 47, having a mirror 29 centrally located thereon, is attached to gimbals 1portion 45 at hinge portions 55 on a second axis 35, 90 degrees from the first axis. Mirror 29, which is on the order of 100 microns in thickness, is suitably polished on its upper surface to provide a specular surface. In order to provide necessary flatness, the mirror is formed with a radius of curvature greater than approximately 2 meters, with increasing optical path lengths requiring increasing radius of curvature. The radius of curvature can be controlled by known stress control techniques such as, by polishing on both opposite faces and deposition techniques for stress controlled thin films, if desired, a coating of suitable material can be placed on the mirror portion to enhance its reflectivity for specific radiation wavelengths.

Mirror assembly 41 also comprises a first pair of permanent magnets 53 mounted on gimbals portion 45 along the second axis and a second pair of permanent magnets 53 is mounted on extensions 51, which extend outwardly from mirror portion 47 along the first axis. In order to symmetrically distribute mass about the two axes of rotation to thereby minimize oscillation under shock and vibration, each permanent magnet 53 preferably comprises a set of an upper magnet 53a mounted on the top surface of the mirror assembly 41 using conventional attachment techniques such as indium bonding, and an aligned lower magnet 53b similarly attached to the lower surface of the mirror assembly as shown in FIGS. 3a–3d. The magnets of each set are arranged serially such as the north/south pole arrangement indicated in FIG. 3c. There are several possible arrangements of the four sets of magnets which may be used, such as all like poles up, or two sets of like poles up, two sets of like poles down; or three sets of like poles up, one set of like pole down, depending upon magnetic characteristics desired.

By mounting gimbals portion 45 to frame portion 43 by means of hinges 55, motion of the gimbals portion 45 about the first axis 31 is provided and by mounting mirror portion 47 to gimbals portion 45 via hinges 55, motion of the mirror portion relative to the gimbals portion is obtained about the second axis 35, thereby allowing independent, selected movement of the mirror portion 47 along two different axes.

Figure 3A:
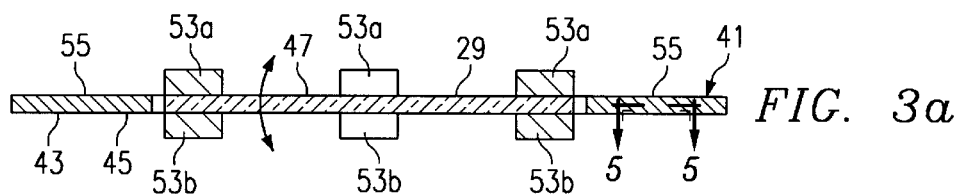
FIG. 3a is a cross sectional view taken on line A—A of FIG. 3.
Figure 3B:
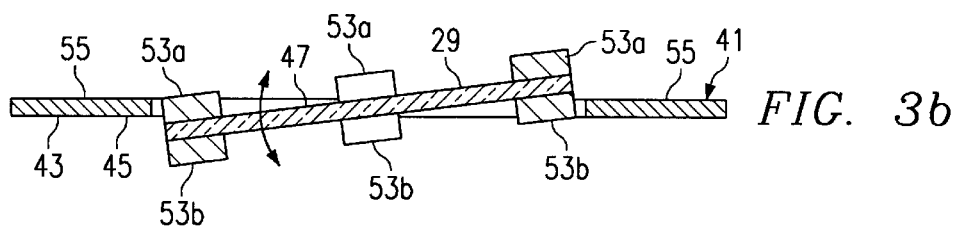
FIG. 3b is a view similar to FIG. 3a but showing rotation of the mirror portion of the mirror assembly.
Figure 3C:
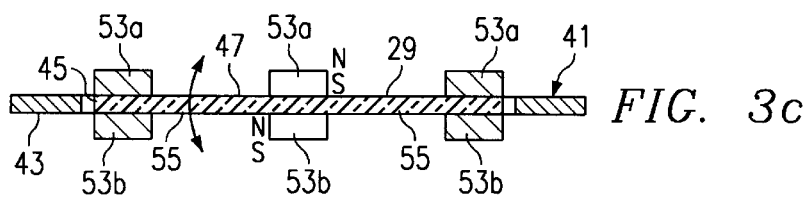
FIG. 3c is a cross sectional view taken on line B—B of FIG. 3.
Figure 3D:
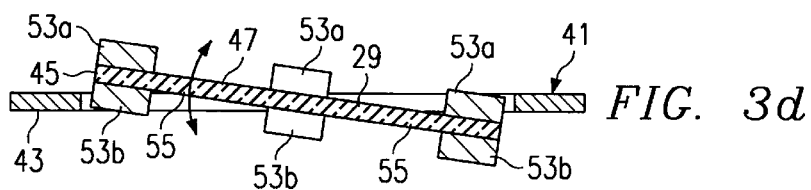
FIG. 3d is a view similar to FIG. 3c but showing rotations of the gimbals portion of the mirror assembly.

The middle or neutral position of mirror assembly 41 is shown in FIG. 3a, which is a section taken through the assembly along line A—A of FIG. 3. Rotation of mirror portion 47 about axis 35 independent of gimbals portion 45 and/or frame portion 43 is shown in FIG. 3b as indicated by the arrow. FIG. 3c shows the middle position of the mirror assembly 41, similar to that shown in FIG. 3a, but taken along line B—B of FIG. 3. FIG. 3d is a view similar to FIG. 3c but showing rotations of the gimbals portion of the mirror assembly. Rotation off the gimbals portion 45 and mirror portion 47 about axis 31 independent of frame portion 43 is shown in FIGS. 3a–3d as indicated by the arrow. The above independent rotation of mirror 29 of mirror portion 47 about the two axes allows direction of optical beam 13 as needed by the optical switch units.

Figure 4:
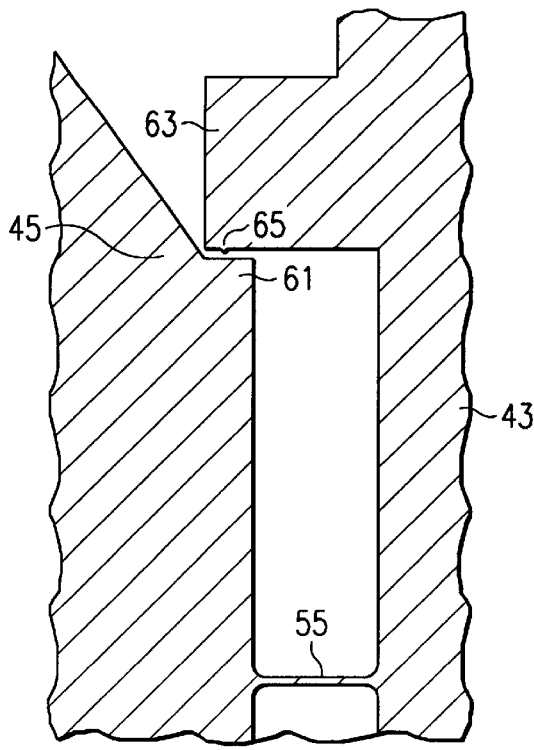
FIG. 4 is an enlarged cross sectional plan view taken on line E—E of 3a showing a hinge and an in-plane motion stop.
Figure 5:
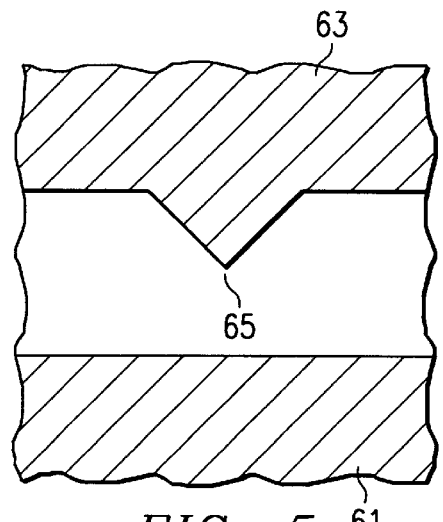
FIG. 5 is an enlarged, broken away portion of FIG. 4 showing a portion of the in-plane stop.

In order to protect hinges 55 from in-plane shock during handling and shipping, stops 57 are provided according to an optional feature of the invention as best shown in FIGS. 4 and 5, which are enlarged sectional views taken on line E—E of FIG. 3a. At this point it should be noted that the mirror assembly is on the order of 100 microns thick, whereas hinge 55 of the same thickness is on the order of 10 microns wide, thereby providing robust strength in directions normal to the surface of the assembly. In order to provide protection against excess in-plane motion 90 degrees to the axis of the hinge, i.e., axis 31, cooperating surfaces 61 on gimbals portion 45 and 63 on frame portion 43 are formed on either side of each hinge 55 and extend generally parallel to axis 31. Surfaces 61 and 63 are spaced apart a selected distance such as 10 microns by way of example. In order to provide less in-plane motion, projection 65, extending from surface 63 towards surface 61, is formed to any selected distance such as 5 microns. It will be understood that such projection could be provided on surface 61 instead of 63 if desired. Similar stops are provided on the mirror and gimbals portions to provide protection against in-plane motion of hinges 55 relative to axis 35.

Figure 6:
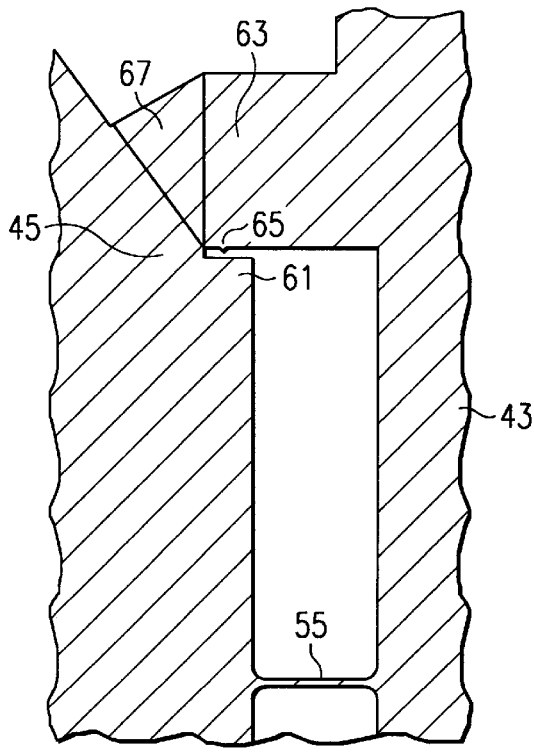
FIG. 6 is a cross sectional plan view taken on line E—E of FIG. 3a, showing a hinge with an optional lock down tab to stop rotation used during manufacture.
Figure 6A:
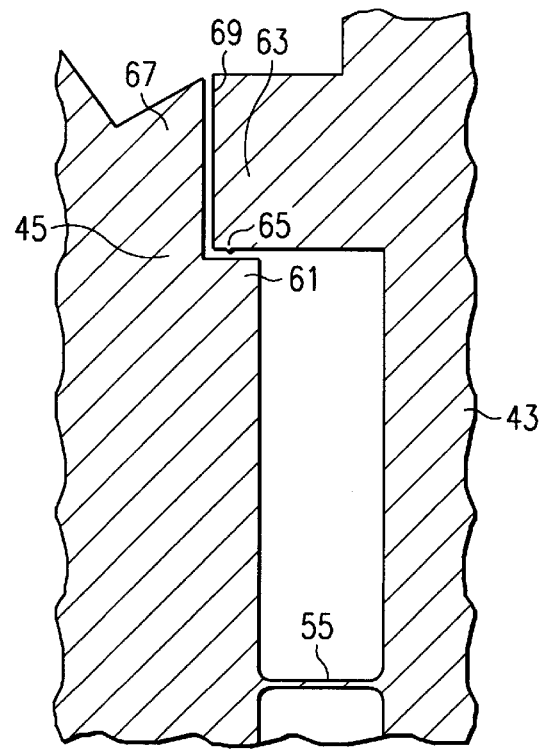
FIG. 6a is a view similar to FIG. 7 showing the lock down tab severed to allow rotation.
Figure 7:
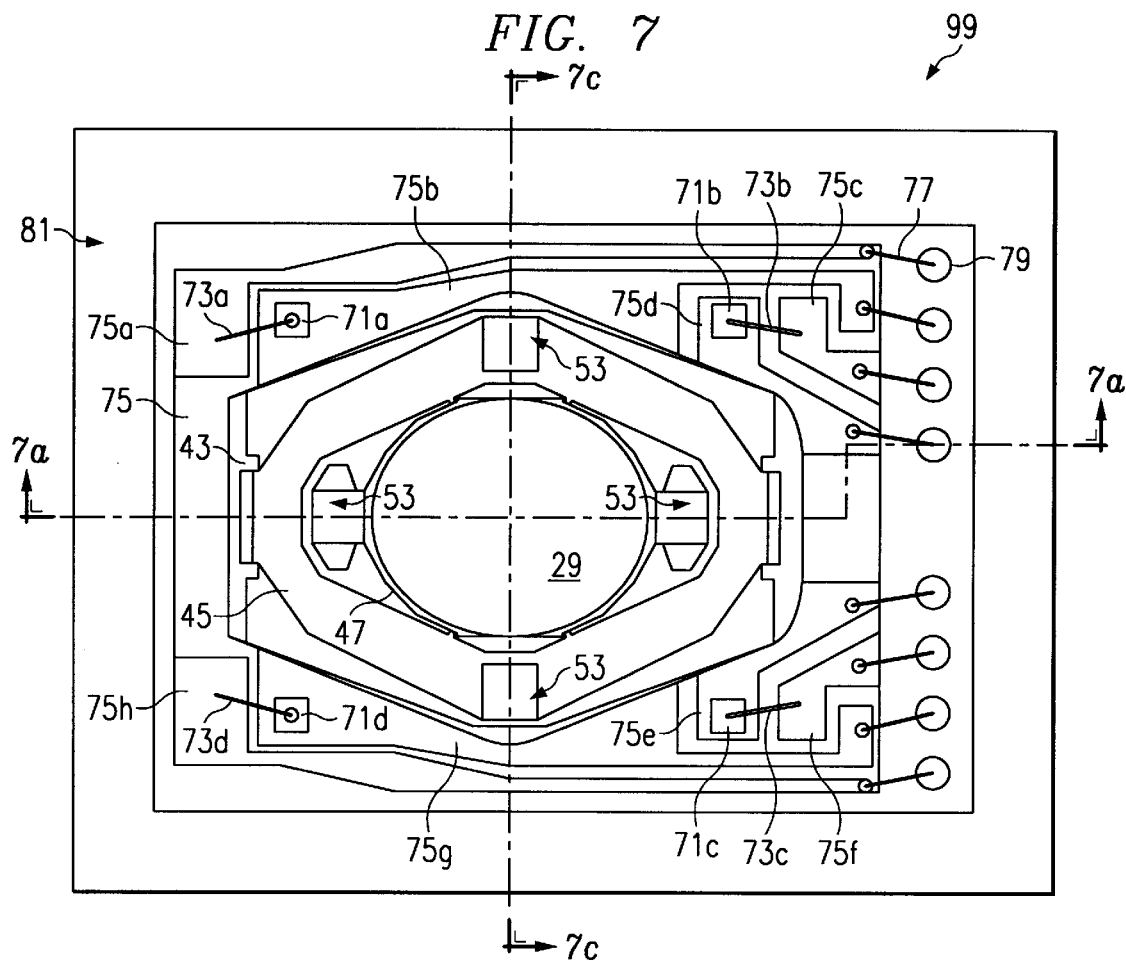
FIG. 7 is a top plan view of an optical switch package made in accordance with the invention.

According to another optional feature of the mirror, lock down tabs associated with each hinge are provided. As seen in FIG. 6, an example showing one such hinge 55, bridge portion 67 extends from gimbals portion 45 to frame portion 43 and locks the two portions together isolating hinge 55 from all normal manufacturing stresses. At the appropriate manufacturing step, the bridge portion 67 is cut providing gap 69 as shown in FIG. 6a: which allows normal rotation of gimbals portion 45 relative to frame portion 43 about the hinge 55. This provides suitable stress protection for all hinges and significantly improves manufacturing yields.

With reference to FIG. 3, extensions 51 are preferably provided with laterally extending tabs 55a which can be used to clamp down the mirror portion during assembly to thereby provide additional stress protection.

Figure 8:
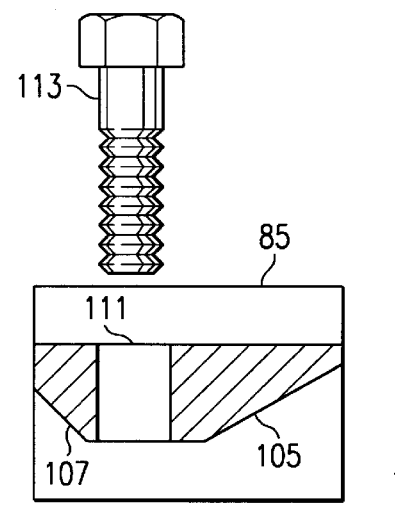
FIG. 8 is an exploded view of a cross sectional, broken away portion of the bottom wall of the housing of an optical switching unit package and the mounting bracket.
Figure 8:
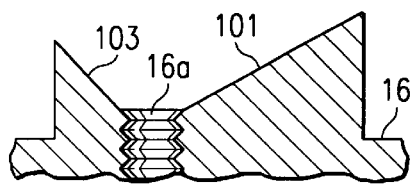

The movable mirror assembly 41 is received in a cavity 81a of a header 81 which forms part of the mirror assembly package shown in FIGS. 8–8d. Header 81 is formed of any suitable material, such as ceramic in the case of a hermetic package and plastic where hermeticity is not required, and has a circumferentially extending shelf 81b formed within cavity 81a on which frame portion 43 of mirror assembly 41 is received. Bottom wall 81c is spaced from shelf 81b to provide clearance for movement of gimbals portion 45 and mirror portion 47. Recesses 81d are formed in bottom wall 81c aligned with each set of magnets 53 to provide motion clearance for lower magnets 53b. The size of the opening of recesses 81d is maintained as small as possible, allowing suitable motion of the magnets, to facilitate making wall 81a as thin as practicable, for example 125 microns.

The magnet drive for the magnets comprise four air coils 91a–91d (two shown in FIGS. 8c–8d) each wound on a bobbin in turn mounted on mounting bracket 85 and aligned with respective recesses 81d and magnets 53. The bobbin and bracket are made of suitable material for good heat transfer, magnetic dampening, and strength such as aluminum. The air coils are wound using high electrical conductivity materials such as copper. The bobbin has an air coil disposed proximate to top end 89a of bobbin 89 such that the air coil is as close to magnets 53 as possible, for example, 200 microns, to provide full mirror rotation using minimum power.

An electrical wiring harness 87 is provided for required electrical connections to the micromirror assembly package 99 and comprises an elongated flex circuit 87 mounting a connector 95 at one end thereof for connection to a control system (indicated at 100, FIG. 8a). An opening 87b is formed at an opposite end which receives therein bobbins 89. Coil leads 97 are attached to appropriate traces on the flex circuit as shown in 8c–8d.

With particular reference to FIG. 8, micromirror assembly package 99 is precisely mounted and orientated in optical switch unit 15 utilizing cooperating registration surfaces of mounting bracket 85 and a portion of wall 16 of switch unit 15. First opposing inclined surfaces 107 and 105 forming a somewhat convex configuration on mounting bracket 85 cooperate with respective second opposing inclined surfaces 103 and 101, forming a somewhat concave, or cradle configuration, respectively, on bottom wall 16 of the switch unit. Mounting bolt 113 is received through bore 111 in bracket 85 and threaded bore 16a in the cradle in bottom wall 16 to secure micromirror assembly package 99 within optical switch unit 15. The cooperating opposed surfaces provide a precise registration in two planes while bolt 113 and its corresponding bore 111 in bracket 85 and threaded bore 16a in wall 16 provides registration in a third plane. It will be realized that the convex and concave configurations can be reversed if desired and further, that the surfaces can be fixed to one another by means other than a bolt. e.g., welding.

Figure 9:
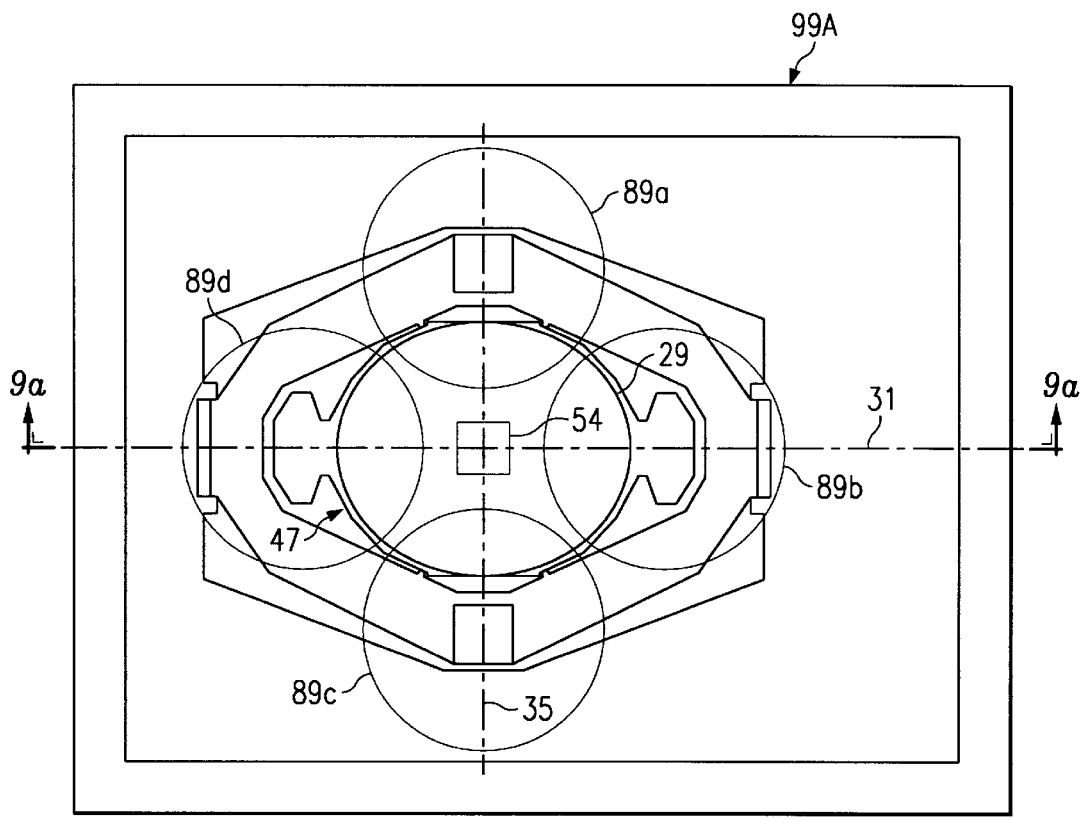
FIG. 9 is a top plan view of a modified embodiment of an optical switch unit with certain parts removed for purposes of illustration.
Figure 9A:
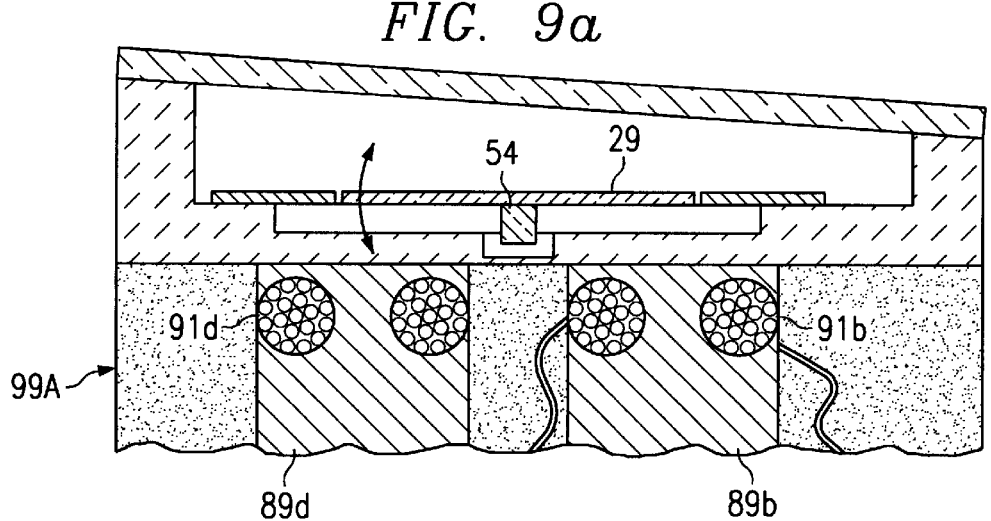
FIG. 9a is a cross sectional view of the top portion of an optical switch unit taken on line F—F of FIG. 9.
Figure 9B:
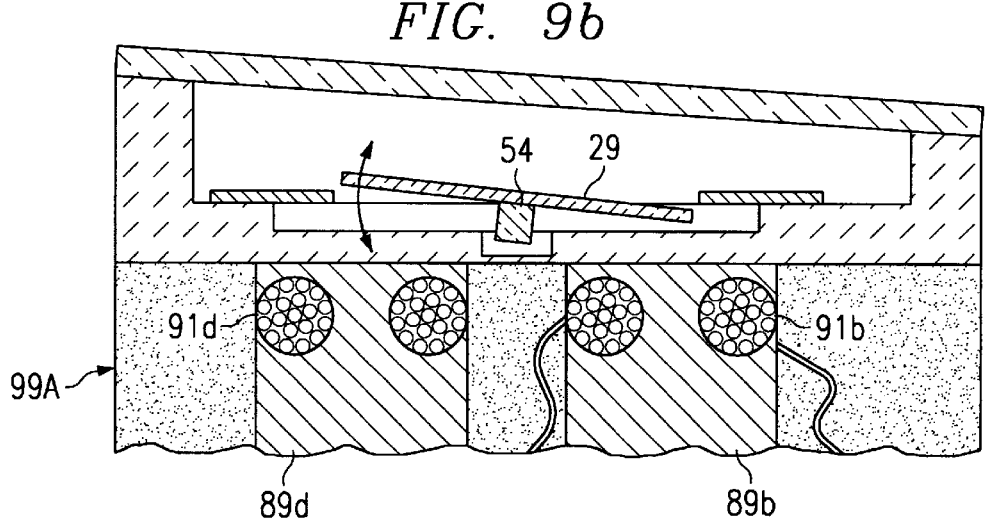
FIG. 9b is a view similar to FIG. 9a but showing rotation of the mirror portion of the modified mirror assembly.

An alternate embodiment is shown in FIG. 9 in which a single permanent magnet 54 is centrally located on the lower side of the mirror portion 47. Air coils 89a–89d are shown located in the same positions as in the FIGS. 3–7 embodiment and can be independently excited so that the interaction of the magnetic field of the permanent magnet and the coils cooperate to produce the appropriate magnetic field to cause movement of the mirror portion along each axis 31 and 35, as desired. Although four air coils are shown, if desired, three air coils could be used to produce the desired magnetic field.

A micromirror assembly package made in accordance with the invention included a mirror portion which measured approximately 3 mm×4 mm in width and length and had approximately 8 degrees of rotation about each of axes 31 and 35.

Figure 10:
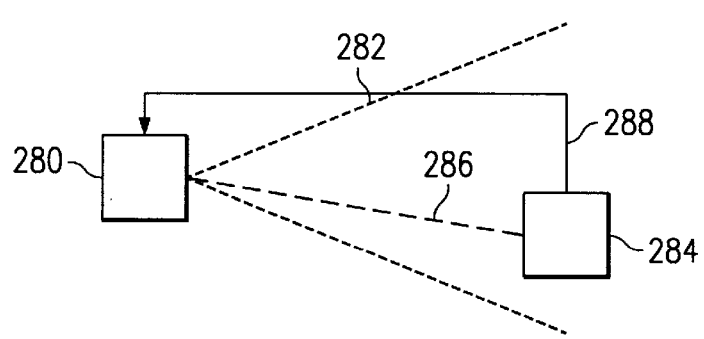
FIG. 10 is a schematic representation of an OWL transmitter and OWL receiver used in the practice of a preferred embodiment of the present invention.

As mentioned above, the inventive method is for establishing and maintaining an optical wireless communication link using a OWL such as described above. The transmitter OWL is assumed to have a non-isotropic light source, such as a collimated laser, which can be modulated in some format with the transmitted data. The transmitter is also assumed to have a beam steering ability to direct the light in some range of directions (field of view) which is larger than the angular spread of the light source. It is also assumed that it is possible to roughly align the transmitter such that the receiver OWL lies within the field of view of the transmitter with a clear line of sight, and that at a given transmitter direction the receiver is able to detect the transmitted light. This is depicted in FIG. 10, wherein it can be seen that a transmitter OWL 280 has a field of view 282. A receiver OWL 284 within that field of view 282 receives transmitted light 286.

Figure 11:
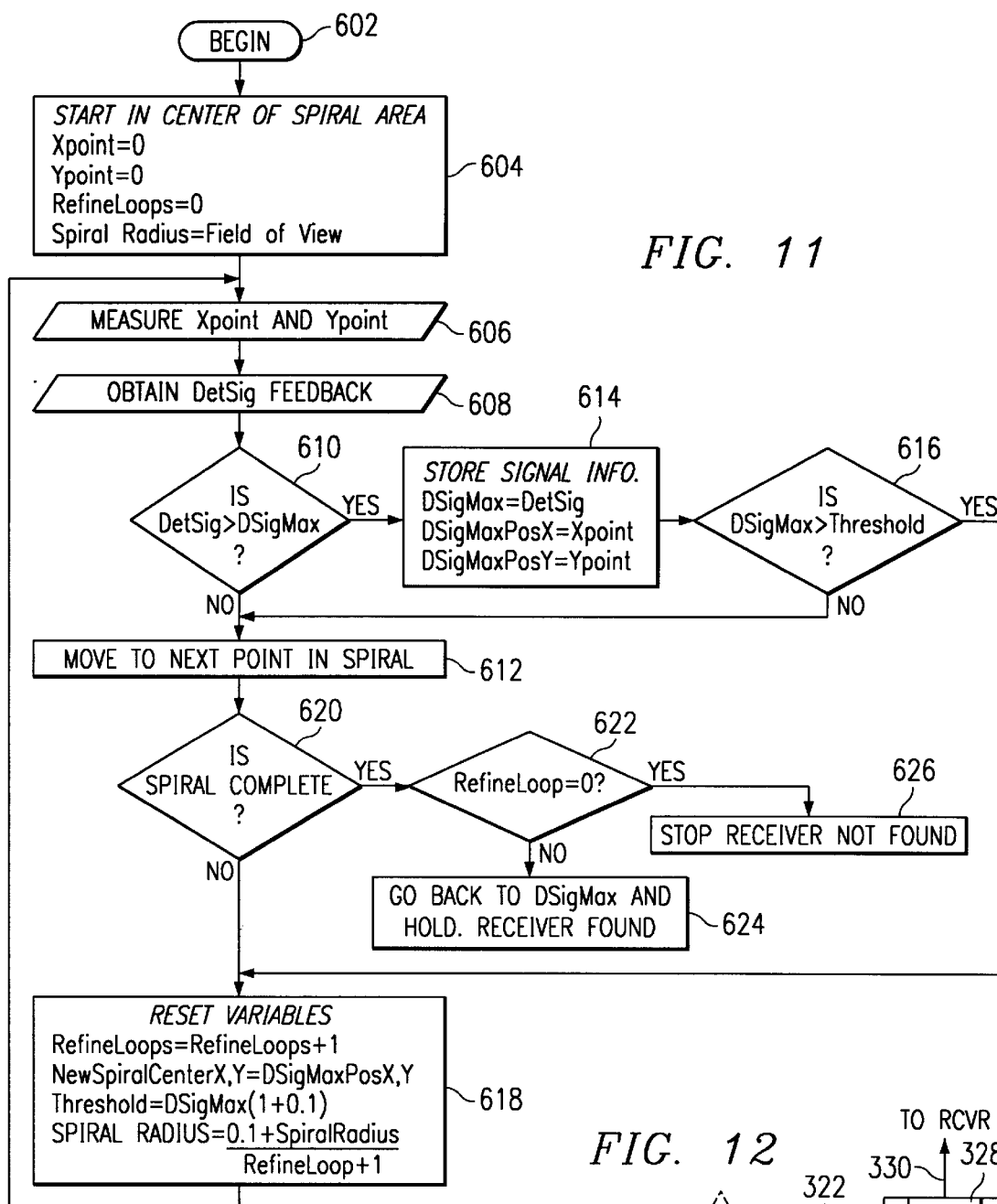
FIG. 11 is a flow chart for a preferred embodiment of a procedure by which a beam is controlled to scan in a circular spiral.
Figure 12:
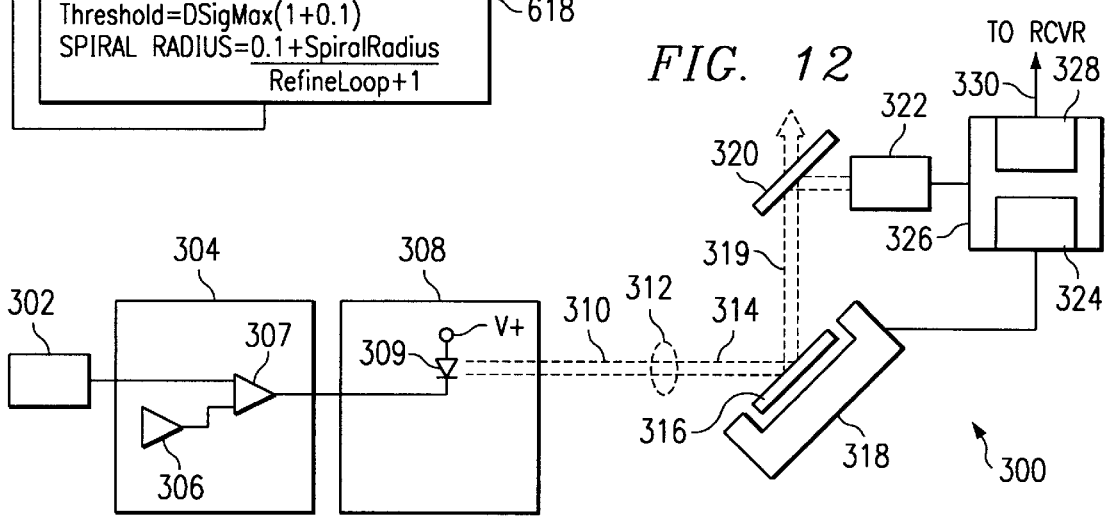
FIG. 12 is a schematic representation of an embodiment of a transmitter for video data transmission in accordance with the present invention.

In a first preferred embodiment of the present invention, it is also assumed that there is a secondary communication link 288 from the receiver OWL 284 to the transmitter OWL 280, as shown in FIG. 12. In this embodiment the method is applied in an optical wireless communication link using half-duplex OWLs. Throughout this method the receiver OWL continuously monitors the intensity of detected light, and when the intensity of the detected light exceeds a threshold value corresponding to the value exceeding the random noise of the detector, a detector event is deemed to occur. The receiver records the time and intensity of the detector light event as well as the data sent-via the secondary communication link to the transmitter. In this method the following steps are performed:

1. The transmitter is approximately aligned to the receiver such that the receiver lies within the field of view of the transmitter.
2. The transmitter is initiated to begin transmitting a constant or varying optical signal and to scan the optical signal in an angular pattern such that when the scan is completed the transmitted light has crossed all positions in the transmitter field of view in time. Note that the spot has a spread. By providing a suitable pattern for the beam, the light can cover all points in the transmitter field during the scan. In the preferred embodiment the scan pattern is, basically, a spiral, that is, a series of expanding, or diminishing, circles or ellipses if the field of view is not symmetric. The spacing between the circles is chosen such that the angular area covered by the spot for two successive circles overlaps. To cover the complete field of view when it is not circular, e.g., when the field of view is rectangular, the scan pattern continues to expand the radius but is restricted to the field of view until the entire field of view is covered. For the case of a rectangular field of view, the ellipses are clipped on the sides so they remain in the field of view until the corners are covered by the scan pattern. After a signal is detected, the second, smaller scan pattern can be a spiral centered on the last detection event. The second method can use the same scan patterns as the first method. The pattern is correlated with time such that any moment in time during the scan corresponds to a determined angle. A flow chart for a preferred embodiment of the procedure by which the beam is controlled to scan in a circular spiral is shown in FIG. 11. This is described in detail below.
3. As the transmitted light crosses the receiver photodetector a detector event occurs. The time and intensity for this event is recorded as data and that data is sent via the secondary communication link to the transmitter.
4. After receiving the time and intensity data, the transmitter correlates the time and intensity data and determines the predetermined position in which the receiver is located. The transmitter then begins a new scan centered on this position. The new scan area is smaller than the previous scan area.
5. When the transmitted light crosses the receiver area during the new scan such that the intensity of the detected light is greater than the previous detection event, the time and intensity of this new detected light event is recorded and data for this new event is sent via the secondary link to the transmitter.
6. If the intensity of light in the new detected light event is greater than the maximum intensity detection event during the last spiral, multiplied by a pre-determined factor greater than or equal to one, steps 4 and 5 are repeated, narrowing the search area in each repetition, until one of the following occurs:

a) The new scan generates no detection event with a detector intensity greater than the starting point of the scan. The transmitter returns to the center of the scan and verifies that the angle produces a continuous string of detection events with an intensity high enough for accurate data transmission. In this case, the center of the scan is the optimum angle for data transmission and the transmitter begins transmitting data. If this is not the case, the process returns to step 3 to re-scan the original scan area.

b) A sufficient number of repetitions occur such that the scan area is significantly smaller than the angular spread of the transmitter light source, in which case the transmitter returns to the angle corresponding to the detection event during the last scan with the highest intensity and verifies that the angle produces a continuous string of detection events with an intensity high enough for accurate data transmission. In this case the center of the scan is the optimum angle for data transmission and the transmitter begins transmitting data. If this is not the case, the process returns to step 3 to re-scan the transmitter field of view.

The scan procedure of FIG. 11 will now be described. In the discussion of FIG. 11 the following variables are discussed, as set forth in Table 1.

TABLE 1

Variables used in FIG. 11

| Variable | Definition |
| --- | --- |
| DetSig | Level of the signal from the detector |
| DSigMax | Maximum detected signal level |
| DSigMaxPosX | X point of the current maximum signal detected |
| DSigMaxPosY | X point of the current maximum signal detected |
| NewSpiralCenterX | Current center of spiral in X direction |
| NewSpiralCenterY | Current center of spiral in Y direction |
| RefineLoops | Number of spiral refinement loops |
| SpiralRadius | Radius of current spiral pattern |
| Threshold | Signal trigger above noise level |
| Xpoint | Current X coordinate |
| Ypoint | Current Y coordinate |

The scan begins 602 with the mirror set to direct the beam in the center of the scan area. The scan area is represented as a coordinate grid, having a horizontal axis, X, and a vertical axis, Y. Note that other representations are possible, and may be preferred, depending on the circumstances and preferences of the programmer; for example, an angle and radius coordinate system may be used. Xpoint, Ypoint and RefineLoops are set to zero, while SpiralRadius is set to a previously stored parameter, Field of View, representing the field of view for the optical link 604. The actual X and Y coordinates of the beam are determined from the PSD 234 (FIG. 1), and stored as Xpoint and Ypoint, respectively 606. The level DetSig of the signal from the detector is obtained 608, and it is determined whether that signal level is greater than the current maximum, DSigMax 610. If it is not, the procedure merely moves to the next point in the spiral, according to a simple algorithm defining the spiral shape 612. However, if the detector signal level DetSig is greater than DSigMax then DSigMax is reset to DetSig, and the corresponding X and Y positions of the beam, Xpoint and Ypoint, respectively, are stored as the values DSigMaxPosX and DSigMaxPosy, respectively, 614, thus setting the point of the current maximum signal. Note that the value DSigMax is preset with an initial stored value corresponding to a signal level above the noise, for example 3 to 10 dB above noise, as desired by the designer, as an initial value. Next in the procedure, it is determined whether DSigMax is greater than the predetemined threshold, Threshold 616. If is not, then the procedure moves to the next point in the spiral 612. However, if DSigMax is greater than Threshold, the following variables are reset: RefineLoops is set to RefineLoops+1, NewSpiralCenterX,Y are set to DSigMaxPosX,Y, respectively, Threshold is set to DSigMax(1+0.1) and SpiralRadius is set to $$\frac{0.1 \cdot SpiralRadius}{RefineLoop + 1}.$$

This keeps track of the number of loops performed, readjusts the spiral center to the new center, increases the threshold by 10%, and decreases the spiral radius by a factor that increases with each loop and starts at 90%, thus causing the scan to "home in" on the right spot 618. The procedure then returns to the measuring of the Xpoint and Ypoint values 606. Returning to step 612, after the move to the next point in the spiral, it is determined whether the spiral is complete, based on the aforementioned spiral shape algorithm 620. If it is not, the procedure goes to step 618, and proceeds as described above. If the spiral is complete, however, it is determined whether the value RefineLoop is equal to zero 622. If it is, that means the entire spiral has been completed without any signal being detected above the predetermined threshold. Therefore, the procedure stops 626, since the receiver was not found in a complete scan. However, if RefineLoop is not zero, then that means that the receiver was found and that after some number of iterations no further increase in the detected signal level was achieved. Therefore, the procedure calls for holding 624, since the receiver was found and the X and Y positions determined for best signal transmission.

An advantage of this method for establishing a link is that the receiver only has one task, that is, observing the signal intensity and relaying detector event data to the transmitter. All decisions are performed by the transmitter link control.

Note that in performing the method the laser output should be fairly constant relative to the time scale of the sweep pattern. This can be accomplished by either varying the data with an encoding scheme such as 4B/5B encoding which has equal numbers of 1's and 0's, on a short time scale, or by holding the laser signal constant. Both methods have a zero frequency (DC) component, but no low frequency variations, i.e., less than one MHz, for fast Ethernet with 4b/5b encoding.

Also note that the pattern need not be a spiral pattern. Any suitable search pattern may be used, such as a raster scan. Again, the beam has a spread, and it is desirable that whatever the pattern selected the pattern have overlaps such that the entire field of view is covered, once the scan is complete.

A second preferred embodiment will now be described. As in the first method, throughout this method the receiver continuously monitors the intensity of detected light, and when the intensity of the detected light exceeds a threshold value corresponding to the value exceeding the random noise of the detector, a detector event is deemed to occur. The receiver records the time and intensity of the detected light event as data, and this data corresponding to this event is sent via the secondary communication link to the transmitter.

1. The transmitter is approximately aligned to the receiver such that the receiver lies within the field of view of the transmitter.

2. The transmitter is initiated to begin transmitting a constant or varying optical signal and to scan the optical signal in an angular pattern such that when the scan is completed the transmitted light has crossed all positions in the transmitter field of view in time. The pattern is correlated with time such that any moment in time during the scan corresponds to a determined angle.
3. As the transmitted light crosses the receiver photodetector a detector event occurs. The time and intensity for this event is recorded as data and that data is sent via the secondary communication link to the transmitter.
4. The transmitter continues until the complete scan area has been scanned. A new scan area is chosen centered on the angle determined by the time corresponding to the highest intensity detector event during the previous scan. The new scan area is smaller than the previous scan area.
5. When the transmitted light crosses the receiver area during the new scan such that the intensity of the detected light is greater than the previous detection event, the time and intensity of the detected light event is recorded and the data sent via the secondary communication link to the transmitter.
6) If the intensity of light in the new detected light event is greater than the maximum intensity detection event during the last spiral, multiplied by a predetermined factor greater than or equal to one, steps 4 and 5 are repeated, narrowing the search area in each repetition, until one of the following occurs:
   a) The new scan generates no detection event with a detector intensity value greater than the starting point of the scan. The transmitter returns to the center of the scan and verifies that the angle produces a continuous string of detection events with an intensity value high enough for accurate data transmission. In this case the center of the scan is the optimum angle for data transmission and the transmitter begins transmitting data. If this is not the case, the process returns to step 3 to re-scan to original scan area.
   b) A sufficient number of repetitions occur such that the scan area is significantly smaller than the angular spread of the transmitter light source, in which case the transmitter returns to the angle corresponding to the detection event during the last scan with the highest intensity and verifies that the angle produces a continuous string of detection events with an intensity high enough for accurate data transmission. In this case the center of the scan is the optimum angle for data transmission and the transmitter begins transmitting data. If this is not the case, the process returns to step 3 to re-scan the transmitter field of view.

An advantage of this method for establishing a link is, as in the first method, that the receiver has only one task, that is, observing the signal intensity and relaying detector event data to the transmitter. All decisions are performed by the transmitter link control. An advantage over the first method is that the threshold for detector events is not critical, since the entire field of view is scanned and the highest intensity detector event is chosen for the next scan. Therefore, spurious detector events unrelated to the transmitted light can be above the threshold, but if they are below the maximum intensity detector event, that will not affect the search process. In the case of the first method, described above, a spurious event will trigger a new scan area at an inappropriate angle. On the other hand, the advantage of the first method is that it is potentially a quicker method to perform, since the scans are terminated as soon as a detector event greater than the previous events occurs.

For a full-duplex optical wireless communications link with full-duplex OWLs on each side of the link, a two-way secondary channel is provided to transfer information between the OWLs. Each of the two transmitter-receiver combinations (transmitter from one OWL to the receiver in the other OWL) in the optical wireless link can be established independently using the steps described above for the half-duplex case.

An embodiment 300 of the present invention is shown in FIG. 12, and will now be described, for transmitting a composite analog video signal using a collimated light beam reflected off a beam steering micro-mirror. The source of the video signal is a composite video co-ax output of a DVD player 302. The DVD video output is connected to an interface unit 304, which includes two high speed op-amps 306, 307, for example THS4052 op-amps from Texas Instruments, Inc., for adjusting the DC offset and gain of the signal such that the voltage is always positive and is less than the maximum voltage for driving a laser diode. The video signal is provided to a first input of amplifying op-amp 307, while op-amp 306 is connected to the second input of op-amp 407 and provides the offset to the output signal. The output of the interface unit 304 is connected to the transmitter section of an optical transceiver unit 308, which consists of a laser diode 309, such as the VCT-F85A20 from Lasermate Corporation, mounted on a frame (not shown) such that the light beam 310 from diode 309 is directed to a lens 312. The video signal is thus transformed from an electrical signal to a light signal.

The light output from the laser diode 309 is collimated using the lens 312, which has the same optical characteristics of lenses used in laser pointers. The collimated light beam 314 reflects off a Silicon micro-mirror 316 in an optical module 318, with the direction of the outgoing reflected light 319 being controlled by the angle of the micro-mirror 316. The outgoing light 319 is partially reflected by a beam splitter 320, such as a Melles Griot #03BTF051, onto a PSD 322 for measuring the direction of the outgoing light. The micro-mirror orientation is controlled by a D/A unit 324, such as a PA-DA12 board from Acqutek, in an IBM compatible computer 326. The computer also contains an RF wireless RS232 unit 328, such as a Unilink from Wireless Mountain, for communicating with a computer at the receiver.

Figure 13:
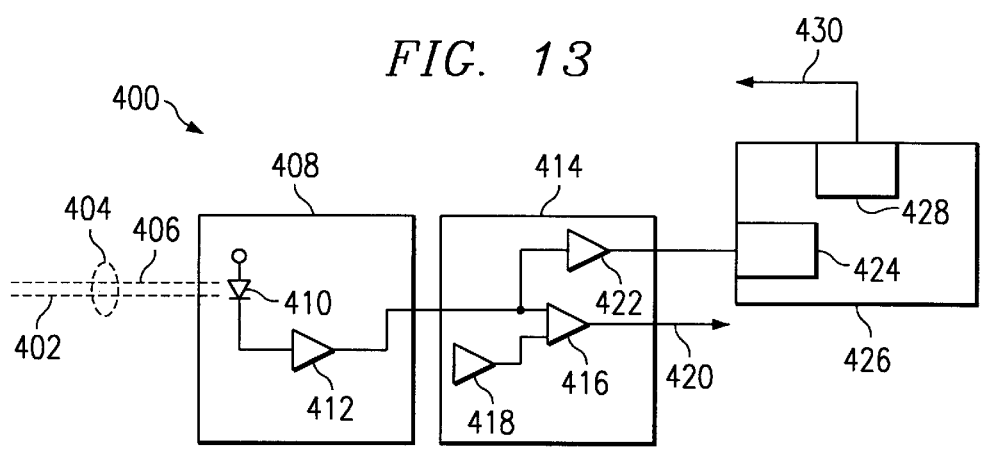
FIG. 13 is a schematic representation of an embodiment of a transmitter for video data transmission in accordance with the present invention.
Figure 7A:
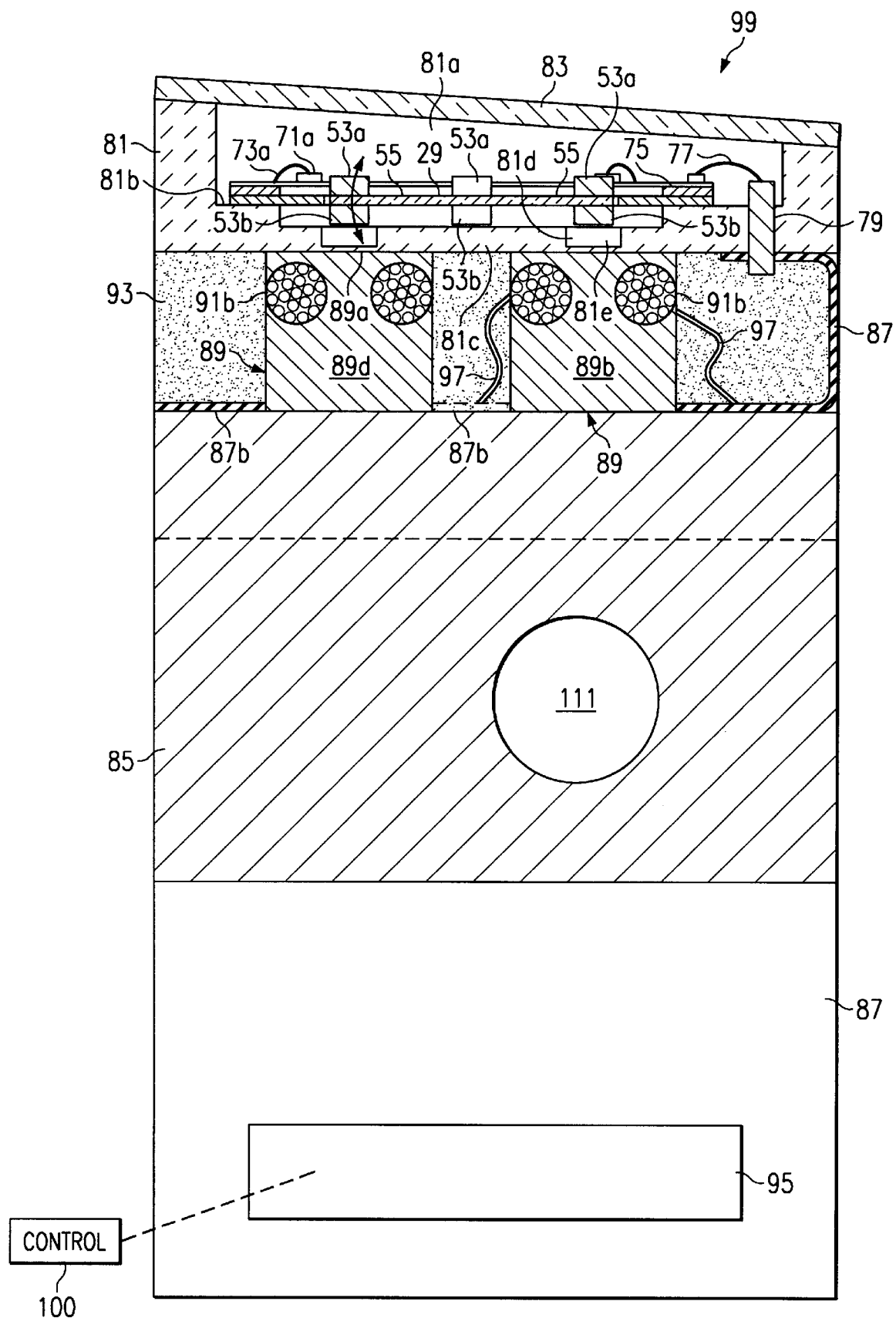
FIG. 7a is a cross sectional view taken on line C—C of FIG. 7.
Figure 7B:
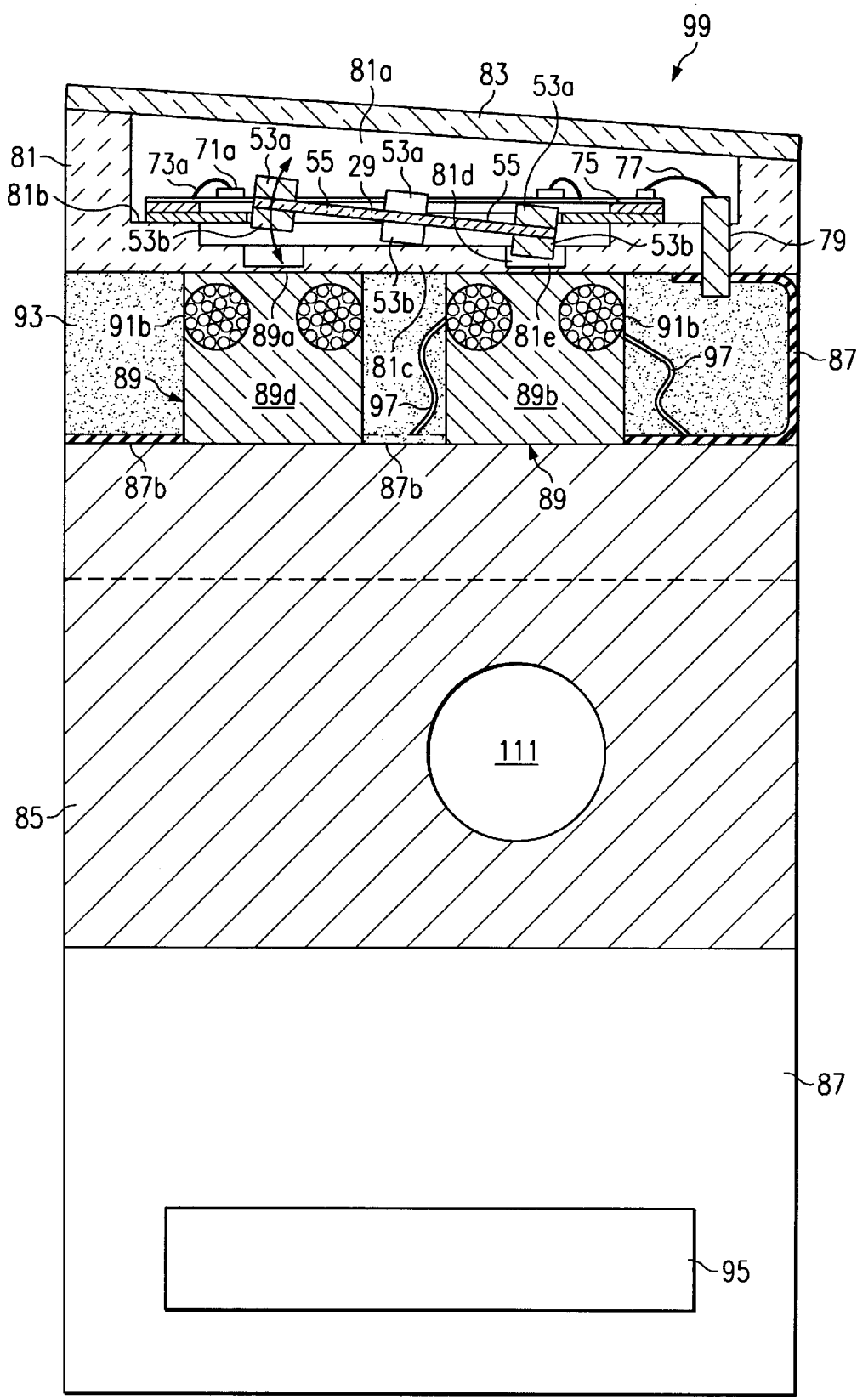
FIG. 7b is a view similar to FIG. 7 showing rotation of the mirror portion of the mirror assembly.
Figure 7C:
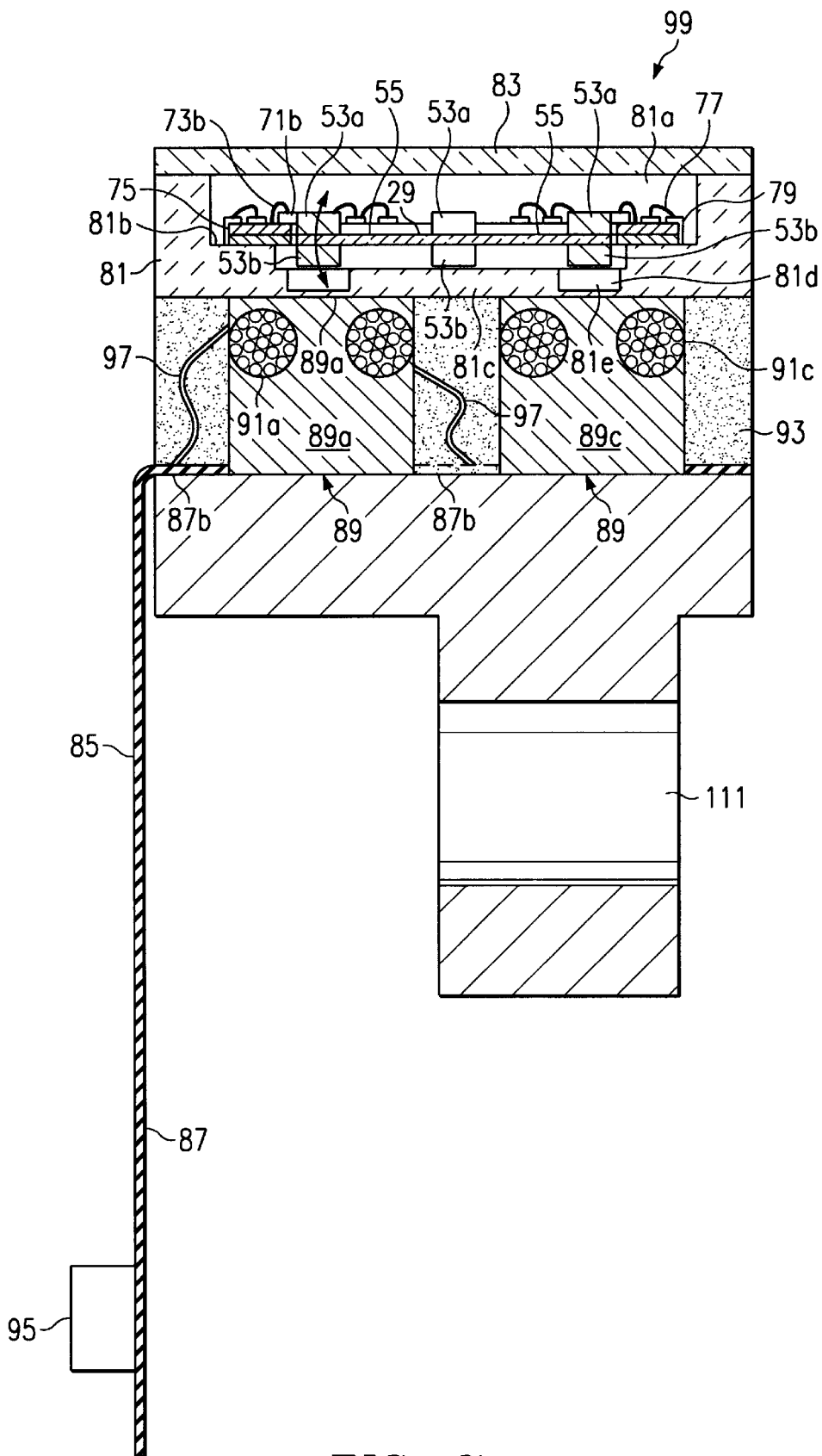
FIG. 7c is a cross sectional view taken on line D—D of FIG. 7.
Figure 7D:
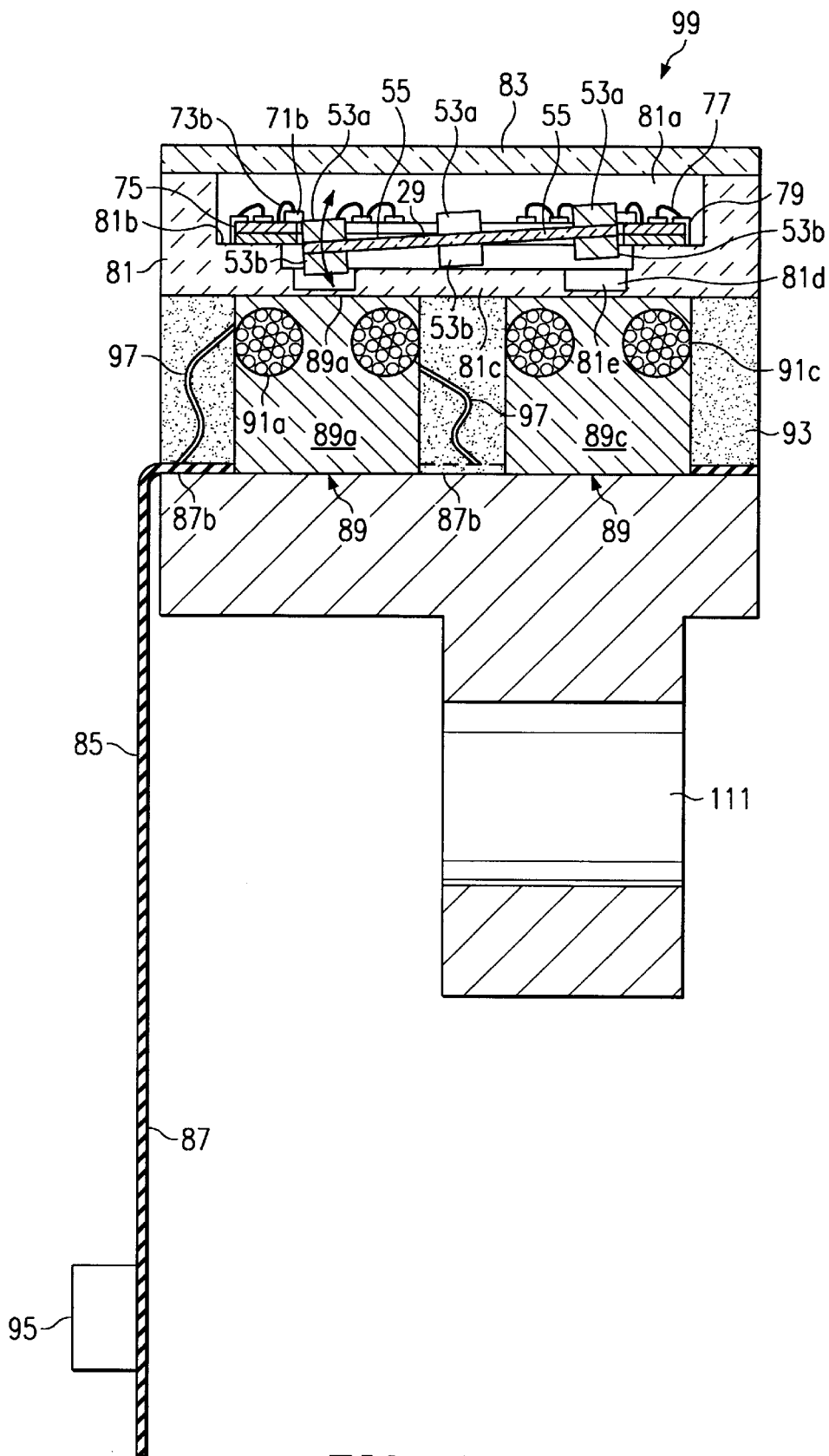
FIG. 7d is a view similar to FIG. 7c but showing rotation of the gimbals portion of the mirror assembly.

An embodiment 400 of the present invention is shown in FIG. 13, and will now be described, for receiving a composite analog video signal. This is preferably the receiving portion of an optical transceiver in which the transmitting portion is as described in connection with FIG. 14. The light beam 402 to be received, for example a light beam like beam 319 from transmitter unit 300 (FIG. 14), is received by an optical module 404, which consists of a lens positioned to focus the light onto a 10 mm PIN diode 410 of an optical transceiver 408. The output of diode 410 is amplified in optical transceiver 408 by a pre-amplifier module 412, such as a Thorlabs PDA155, the output of which is the output of the optical transceiver 408. The output signal of the optical transceiver 408 is connected to a first input of a high speed op-amp 416 in an interface unit 414. Another high speed op-amp 418 is connected to a second input of op-amp 416, and provides an offset to the output of op-amp 416, which is the primary output 420 of optical transceiver 408. The interface unit 414 thus offsets and amplifies the output signal of the optical transceiver 408 signal so it is compatible with a TV.

The interface unit 414 also includes a further high speed op-amp 422 having its input connected to the output of optical transceiver unit 408. Op-amp 422 amplifies the signal and sends it to a AMD unit 424, such as an Acqutek PA-AD12, in an IBM compatible computer 426. The computer 426 also contains an RF wireless RS232 unit 428 to communicate via an RS232 line 430 with the computer on the transmitter side (not shown).

Assuming that a communications link is to be established using two optical wireless link transceiver units such as described above in connection with FIGS. 14 and 15, a link is established by the transmitter computer 326 executing a first routine that causes the micro-mirror 316 to scan the light beam 319 in a spiral pattern of steadily increasing size, such that adjacent scans partially overlap, until an increase in the light signal is detected by the receiver computer 426, which communicates that information through the wireless RS232 link 330/430 to the transmitter computer 324. The transmitter computer 324 then executes a second routine that causes the micro-mirror to scan the light beam in a small search pattern around the angle at which the increase in light signal was detected, to find the optimum mirror orientation for peak signal transmission. This small search pattern can be an increasing spiral pattern, like the first pattern, but of smaller dimensions. The computer then holds the angles while the video signal is transmitted.

Although the present invention and its advantages have been described in detail, it should be understood that various changes, substitutions and alterations can be made herein without departing from the spirit and scope of the invention as defined by the appended claims.

What is claimed is:

1. A method for controlling an optical, path-to-sight link, the optical link including a source of light having a beam of light, a controllable beam steering device and an actuator to permit steering said light beam, the beam steering device being controllable by predetermined control signals, comprising the steps of:

controlling the beam steering device so as to scan the beam of light in a first predetermined pattern;

receiving first light detection data from a remote receiver including a light detector, the light detection data corresponding to the detection of said beam by said light detector;

responsive to said first light detection data, determining a first beam direction for data communication from the link to the receiver;

controlling the beam steering device to maintain a communications beam direction corresponding to said first beam direction; and modulating said beam of light with electronic signals;

wherein said controllable beam steering device comprises a micro-mirror.

2. A method for controlling an optical, path-to-sight link, the optical link including a source of light having a beam of light, a controllable beam steering device and an actuator to permit steering said light beam, the beam steering device being controllable by predetermined control signals, comprising the steps of:

controlling the beam steering device so as to scan the beam of light in a first predetermined pattern;

receiving first light detection data from a remote receiver including a light detector, the light detection data corresponding to the detection of said beam by said light detector;

responsive to said first light detection data, determining a first beam direction for data communication from the link to the receiver;

controlling the beam steering device to maintain a communications beam direction corresponding to said first beam direction; and modulating said beam of light with electronic signals;

wherein said beam steering device comprises a rotatable mirror fabricated from a silicon substrate, and wherein said step of controlling the beam steering device so as to scan the beam of light in a first predetermined pattern is performed by controlling said rotatable mirror.

* * * * *